United States Patent
Stewart et al.

(10) Patent No.: US 9,380,500 B1
(45) Date of Patent: Jun. 28, 2016

(54) METHODS AND APPARATUS FOR RADIO LINK FAILURE REPORTING

(71) Applicant: Nokia Solutions and Networks Oy, Espoo (FI)

(72) Inventors: Sue Stewart, Hawthorn Woods, IL (US); Rossella De Benedittis, Ulm (DE); Amit Malik, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/593,187

(22) Filed: Jan. 9, 2015

(51) Int. Cl.
*H04W 36/00* (2009.01)
*H04W 36/30* (2009.01)
*H04W 36/14* (2009.01)

(52) U.S. Cl.
CPC ...... *H04W 36/0055* (2013.01); *H04W 36/0061* (2013.01); *H04W 36/0088* (2013.01); *H04W 36/14* (2013.01); *H04W 36/30* (2013.01)

(58) Field of Classification Search
None
See application file for complete search history.

(56) References Cited

U.S. PATENT DOCUMENTS

| 6,097,953 | A * | 8/2000 | Bonta | H04W 36/30 455/436 |
|---|---|---|---|---|
| 2007/0155329 | A1* | 7/2007 | Mehrabanzad | H04B 7/18506 455/63.1 |
| 2009/0323638 | A1 | 12/2009 | Catovic et al. | |
| 2012/0281548 | A1* | 11/2012 | Lin | H04W 36/30 370/242 |
| 2013/0260745 | A1 | 10/2013 | Johansson et al. | |
| 2014/0098690 | A1* | 4/2014 | Siomina | G01S 5/12 370/252 |
| 2014/0098691 | A1* | 4/2014 | Kazmi | G01S 5/12 370/252 |
| 2014/0206360 | A1 | 7/2014 | Wegmann et al. | |
| 2015/0092746 | A1* | 4/2015 | Jang | H04W 24/08 370/331 |

FOREIGN PATENT DOCUMENTS

CN 104135746 A 11/2014

OTHER PUBLICATIONS

3GPP TS 32.425 V12.0.0; "$3^{rd}$ Generation Partnership Project; Technical Specification Group Services and System Aspects; Telecommunication management; Performance Management (PM); Performance measurements Evolved Universal Terrestrial Radio Access Network (E-UTRAN) (Release 12)"; Jun. 2013; whole document (74 pages).

3GPP TS 36.331 V12.3.0; "$3^{rd}$ Generation Partnership Project; Technical Specification Group Radio Access Netowrk; Evolved Universal Terrestrial Radio Access (E-UTRA); Radio Resource Control (RRC); Protocol specification (Release 12)"; Sep. 2014; whole document (378 pages).

(Continued)

*Primary Examiner* — Diane Mizrahi

(74) *Attorney, Agent, or Firm* — Harrington & Smith

(57) ABSTRACT

Systems and techniques for improved mobility robustness optimization. A user device experiencing a radio link failure sends a radio link failure report upon successfully connecting to a cell. The radio link failure report is routed to an appropriate cell, such as the cell where the radio link failure occurred. Radio conditions measurement information appearing in the radio link failure report is compared against each possible applicable threshold that might have been used by the user device, and a failure event is recorded for each comparison that indicates a failure, such as a radio link failure or handover failure. The failure event information is forwarded to suitable network elements for analysis and improvement of mobility robustness optimization operations.

29 Claims, 3 Drawing Sheets

(56) References Cited

OTHER PUBLICATIONS

3GPP TS 32.425 V13.0.0 (Dec. 2014); 3rd Generation Partnership Project; Technical Specification Group Services and System Aspects; Telecommunication management; Performance Management (PM); Performance measurements Evolved Universal Terrestrial Radio Access Network (E-UTRAN) (Release 13).

3GPP TS 32.521 V11.1.0 (Dec. 2012); 3rd Generation Partnership Project; Technical Specification Group Services and System Aspects; Telecommunication Management; Self-Organizing Networks (SON) Policy Network Resource Model (NRM) Integration Reference Point (IRP); Requirements (Release 11).

* cited by examiner

METHODS AND APPARATUS FOR RADIO LINK FAILURE REPORTING

FIELD OF THE INVENTION

The present invention relates generally to wireless communication. More particularly, the invention relates to improved systems and techniques for improved radio link failure reporting

BACKGROUND

One important aspect of cellular service is the handover—the transfer of a connection with a user device from a first base station to a second when the connection to the first base station no longer provides acceptable signal quality. One mechanism used to manage handovers is mobility robustness optimization, which encompasses the automated optimization of parameters affecting handovers to insure good user quality of service and performance, while taking into account possible self-optimizing network features such as automatic neighbor relation and load balancing. The mobility robustness optimization function relies on the base station to record accurate radio link failure and handover failure events that occur at a particular handover measurement threshold configured at a user device. The recording of radio link failure and handover failure events allows a network to adjust its handover measurement threshold so as to reduce subsequent radio link failure and handover failure events.

SUMMARY OF THE INVENTION

In one embodiment of the invention, an apparatus comprises at least one processor and memory storing a program of instructions the memory storing the program of instructions is configured to, with the at least one processor, configure the apparatus to at least examine one or more measurements of radio conditions experienced by a user device operating in a wireless communication network, compare each of the one or more measurements of radio conditions against every threshold applicable to that measurement, that could have been the threshold configured for use at the user device at the time of the measurement, and record a failure event for each comparison that indicates that a failure could have occurred.

In another embodiment of the invention, a method comprises examining one or more measurements of radio conditions experienced by a user device operating in a wireless communication network, comparing each of the one or more measurements of radio conditions against every threshold applicable to that measurement, that could have been the threshold configured for use at the user device at the time of the measurement, and recording a failure event for each comparison that indicates that a failure could have occurred.

In another embodiment of the invention, a computer readable medium stores a program of instructions. Execution of the program instructions by a processor configures an apparatus to at least examine one or more measurements of radio conditions experienced by a user device operating in a wireless communication network, compare each of the one or more measurements of radio conditions against every threshold applicable to that measurement, that could have been the threshold configured for use at the user device at the time of the measurement, and record a failure event for each comparison that indicates that a failure could have occurred.

DETAILED DESCRIPTION

Figure 1:
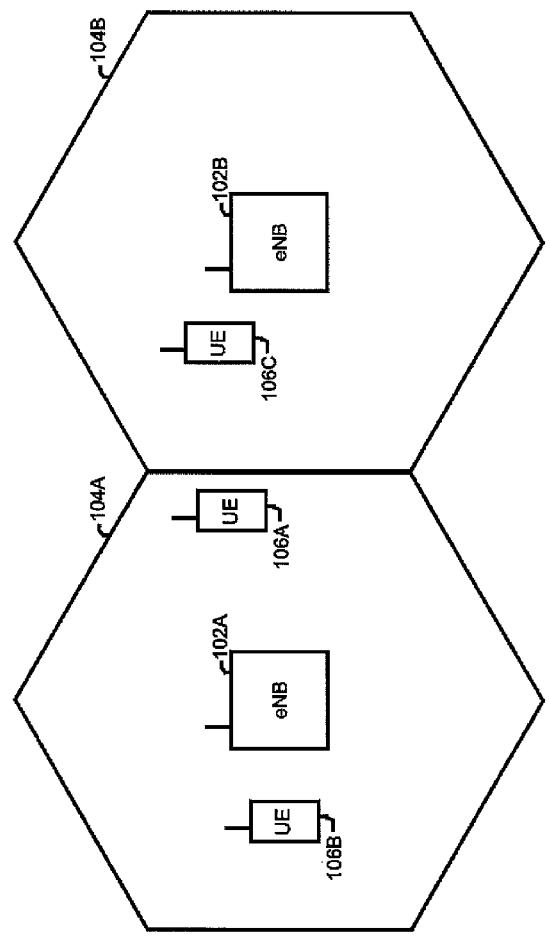
FIG. 1 illustrates a network according to an embodiment of the present invention.

The present description is presented in terms of third generation partnership project (3GPP) long term evolution (LTE) and 3GPP LTE-advanced (3GPP LTE-A) systems, but it will be recognized that the systems and techniques described herein may be used in any suitable environment.

One important area in the technical field of mobile radio communications relates to the handover of User Equipment (UE) from a serving cell to a (neighboring) target cell and the optimization of parameters controlling the handover. In this technical field, Self Optimizing Networks (SON) and in particular the failure type and key performance indicator (KPI) specification needed for Mobility Robustness Optimization (MRO) are significant goals. In cases involving inter-radio access technology (inter-RAT) mobility—that is, handover between different RATs, such as from LTE to a universal terrestrial access network (UTRAN), a more detailed failure type specification may prove particularly useful.

The goal of MRO is to optimize network configuration parameters, such as handover (HO) trigger parameters, handover thresholds, or handover timers) in such a way as to reduce the number of radio link failures (RLFs) due to handover failures or irregularities.

One approach to gathering information useful in mobility robustness optimization is for a user device (implemented and referred to as a user equipment or UE in embodiments of the invention operating according to 3GPP standards and developments thereof) connecting to an LTE cell (suitably manifested as an evolved Node B (eNB)) to provide to the eNB information related to the most recently occurring radio link failure (RLF) or handover failure to the LTE eNB. In one or more embodiments of the invention, this information is provided in what is referred to as an "RLF report," which is ultimately received at the source cell in which the RLF or handover failure actually occurred.

3GPP technical specification 36.331 defines the RLF report as follows:

```
RLE-Report-r9 ::=              SEQUENCE {
  measResultLastServCell-r9      SEQUENCE {
    rsrpResult-r9                  RSRP-Range,
    rsrqResult-r9                  RSRQ-Range
  OPTIONAL
  },
  measResultNeighCells-r9        SEQUENCE {
    measResultListEUTRA-r9         MeasResultList2EUTRA-r9
    OPTIONAL,
    measResultListUTRA-r9          MeasResultList2UTRA-r9
    OPTIONAL,
    measResultListGERAN-r9         Meas ResultListGERAN
    OPTIONAL,
    measResultsCDMA2000-r9         MeasResultList2CDMA2000-r9
  OPTIONAL
  }    OPTIONAL,
  ...,
  [[   locationInfo-r10            LocationInfo-r10
  OPTIONAL,
    failedPCellId-r10                   CHOICE {
      cellGlobalId-r10
```

-continued

```
CellGlobalIdEUTRA,
    pci-arfcn-r10                      SEQUENCE
        physCellId-r10
PhysCellId,
        carrierFreq-r10
ARFCN-ValueEUTRA
        }
    }
            OPTIONAL,
    reestablishmentCellId-r10          CellGlobalIdEUTRA
OPTIONAL,
    timeConnFailure-r10                INTEGER (0..1023)
OPTIONAL,
    connectionFailureType-r10          ENUMERATED {rlf, hof}
OPTIONAL,
    previousPCellId-r10                CellGlobalIdEUTRA
OPTIONAL
]],
[[    failedPCellId-v1090              SEQUENCE {
    carrierFreq-v1090                    ARFCN-ValueEUTRA-v9e0
    }
            OPTIONAL
]],
[[    basicFields-r11                  SEQUENCE {
    c-RNTI-r11                           C-RNTI,
    rlf-Cause-r11                        ENUMERATED {
                                             t310-
Expiry, randomAccessProblem,
                                             rlc-
MaxNumRetx, spare1},
    timeSinceFailure-r11                 TimeSinceFailure-r11
    }
            OPTIONAL,
    previousUTRA-CellId-r11            SEQUENCE {
    carrierFreq-r11                      ARFCN-ValueUTRA,
    physCellId-r11                       CHOICE {
    fdd-r11
PhysCellIdUTRA-FDD,
    tdd-r11
PhysCellIdUTRA-TDD
    },
    cellGlobalId-r11                     CellGlobalIdUTRA
OPTIONAL
    }
            OPTIONAL,
    selectedUTRA-CellId-r11            SEQUENCE {
    carrierFreq-r11                      ARFCN-ValueUTRA,
    physCellId-r11                       CHOICE {
    fdd-r11
PhysCellIdUTRA-FDD,
    tdd-r11
PhysCellIdUTRA-TDD
    }
]
            OPTIONAL
]]
}
```

The eNB can generally be expected to use the information in the RLF report to record an appropriate failure event based on any handover threshold parameters that were in use at the time of the failure. The RLF report may be received as much as 48 hours after the failure occurs, so that the context in which the UE was operating may no longer be present. The information received in the RLF report, then, needs to be sufficient to allow determination of the handover threshold parameters that were in use at the time of the failure so that it can record the appropriate event for the handover threshold.

The RLF report provides information about the technology, frequency, and cell selected by the UE after occurrence of the RLF. The report also provides measurements for all radio access technologies and frequencies that the UE was directed to measure. The RLF report does not, however, provide sufficient information to determine the specific handover threshold used by the UE for each radio access technology and frequency in use at the time of the failure. One or more embodiments of the invention therefore provide mechanisms to deal with occasions in which there are multiple threshold values that could have been configured at the UE for each radio access technology and frequency.

For each of a number of different configurations in which a UE may be used, different handover thresholds (UTRAN cell signal levels used to trigger a handover) may be needed for different circumstances and uses. For example, if the UE is connected to an LTE cell with a service (for example, a VoLTE call) that can be served by a UTRAN cell at a better quality, the configuration provided to that UE for measuring neighbor UTRAN cells (B2-threshold2 or B1 threshold) will likely contain a lower handover threshold value for the UTRAN cell signal, as compared to the one provided to a UE (B2-threshold2 or B1 threshold) with a service (for example, a data call) which can be served by a LTE cell with higher throughput.

Much of the discussion that follows is presented in terms of the RLF report, but it will be recognized that the RLF report is not the only approach to obtaining and analyzing information that may be useful in mobility robustness optimization.

FIG. 1 illustrates a network 100 according to an embodiment of the present invention. The network 100 comprises eNBs 102A and 102B, defining cells 104A and 104B, respectively. In the present example, the eNB 102A is an LTE eNB and the eNB 102B is a UTRAN eNB, so that the cell 104A is an LTE cell and the cell 104B is a UTRAN cell. The network 100 supports UEs 106A-106C, and the 106A happens to be near the cell edge of the cell 104A and subject to experiencing an RLF requiring a handover to the cell 104B.

In the present example, handover to UTRAN is used to handover a UE from LTE to UTRAN in either of the two following conditions: when the UE has reached the edge of LTE coverage, and the UE is in a VoLTE call; and when the UE has reached the edge of LTE coverage, and the UE is not in a VoLTE call.

One exemplary case is a "Too Late Handover to UTRAN" case, in which a B2 event is configured at the UE, but the UE encounters RLF before the B2 threshold2 (for a neighbor cell) is met, that is, before it can be handed over to a UTRAN cell (in the present example, the cell 104A) from the actual LTE serving cell (in the present example, the cell 104B). The connection with the LTE cell 104A drops and the UE 106A selects a UTRAN cell 104B to connect to. The UTRAN cell 104B is determined by the UE 106A to provide a sufficient signal for successful connection, even if it is not sufficient to meet the B2 threshold as configured (this B2 threshold may be a VoLTE threshold or non-VoLTE threshold, whichever had been originally configured at the UE 106A) to trigger a handover before the radio link fails. Once the UE 106A regains a connection with any LTE cell (for example, the cell 104C), the UE 106A will send an RLF report to the LTE cell. The RLF report is ultimately forwarded to the source cell (104A) where the RLF occurred.

The source cell 104A will recognize that the UE experienced RLF and then selected a UTRAN cell to connect to. The source cell will then try to determine which handover threshold was configured at the UE and thus associated with the RLF occurrence. For example, if the threshold was set higher than needed, the excessive threshold may be thought of as responsible for the RLF. In the present example, there may be two possible B2 threshold2 measurement threshold parameters at the source cell which could have been configured at the UE. For example, b2threshold2VoLTEValue may be configured when the UE is in a VoLTE call, and b2threshold2NonVoLTEValue may be configured when the UE is not in a VoLTE call. The RLF report from the UE does not include sufficient information to identify which threshold was configured at the UE when the failure occurred—the eNB does not know whether the failure was a failure to meet b2threshold2VoLTEValue, or a failure to meet b2threshold2NonVoLTEValue.

A related issue has to do with the fact that different services may use different events but both measure the target RAT; for example PSHO uses B2, but CSFB uses B1—both measure the target RAT. Again, either the B2 threshold2 for PSHO threshold could have been configured at the UE, or the B1 for CSFB threshold could have been configured at the UE when the failure occurred. The RLF Report does not provide adequate information to help the eNB determine which of these thresholds was in use.

To address this problem, the LTE eNB (104A) uses the measurement information provided in the RLF report to compare against all possible handover measurement thresholds that could have been configured at the UE (106A) for the technology and frequency of the cell (104B) that was ultimately selected by the UE (106A) that experienced the RLF failure. The information for each threshold is used to determine whether the failure could have occurred due to a failure to meet that threshold. If a particular measurement threshold is not met, it can be inferred that the measurement threshold was set to a value that would not have allowed the handover to be triggered soon enough to avoid an RLF before the handover (that is, the handover is a "too late" handover because the RLF would not have occurred if the UE had been handed over to the UTRAN sooner). The comparison is performed for each measurement threshold that could have been the configured threshold at the UE at the time of the failure, and the failure event will be recorded for each threshold that was not met.

Similarly, when a handover has been initiated to a target technology, frequency, and cell, but the UE is unable to acquire the target cell (that is, a handover failure occurs) the LTE eNB (104A) will use the measurement information provided in the RLF report to perform comparisons against the handover measurement thresholds available for the target technology and frequency. This procedure is used to determine whether the failure could have occurred because the threshold that was actually in use was set to a value that allowed the handover to be triggered too early so that a handover failure would have occurred. The comparison is performed for each measurement threshold that could have been the configured threshold at the UE at the time of the failure, and the failure event will be recorded for each of these thresholds that was met.

It will be recognized that generation and analysis of a radio link failure is not the only approach to gathering information relating to radio conditions relating to failures. In general, information useful for gaining insight into radio link failures (usable, for example, in mobility robustness optimization) may be gained through detection that a radio link failure has been experienced by a user device operating in a wireless communication network, with information being gathered and analyzed to determine the cause or causes of the failure. One aspect of such gathering and analysis of information involves comparing measurements of radio conditions against thresholds. Each of the one or more measurements of radio conditions may be compared against every threshold applicable to that measurement, that could have been the threshold configured for use at the user device at the time of the radio link failure, with a failure event being recorded for each comparison that indicates a failure.

It is possible, then, for an eNB to receive information indicating a failure (such as a failure to handover to the selected cell, or a premature handover) without a need for a radio link failure report, and such information can be analyzed to perform comparisons against available thresholds. For example, the LTE eNB may become aware that the UE is attempting to access a different cell than the one selected for handover—for example, the selected cell is the previous serving cell. In such a case, the LTE eNB can use the measurement report that triggered the handover to perform comparisons against each possible handover measurement threshold available for the handover target technology and frequency.

Similarly, if the LTE eNB becomes aware that the UE is attempting to access another cell before a handover has been triggered—for example, via an X2 RLF INDICATION from the newly selected LTE eNB—it can use the measurement configuration for the selected technology and frequency to perform comparisons against each possible measurement threshold that would have triggered the handover to that selected technology and frequency.

The RLF report is defined by 3GPP technical specification (TS) 36.331, and the measurements that are included in the RLF report as so defined do not provide the thresholds in use or any other information to aid in identifying the thresholds in use. The failure events (RLF and handover failure) described above will be used by the MRO function to optimize each of the handover measurement thresholds to be used, based on statistical analysis of the failure event occurrences.

Figure 2:
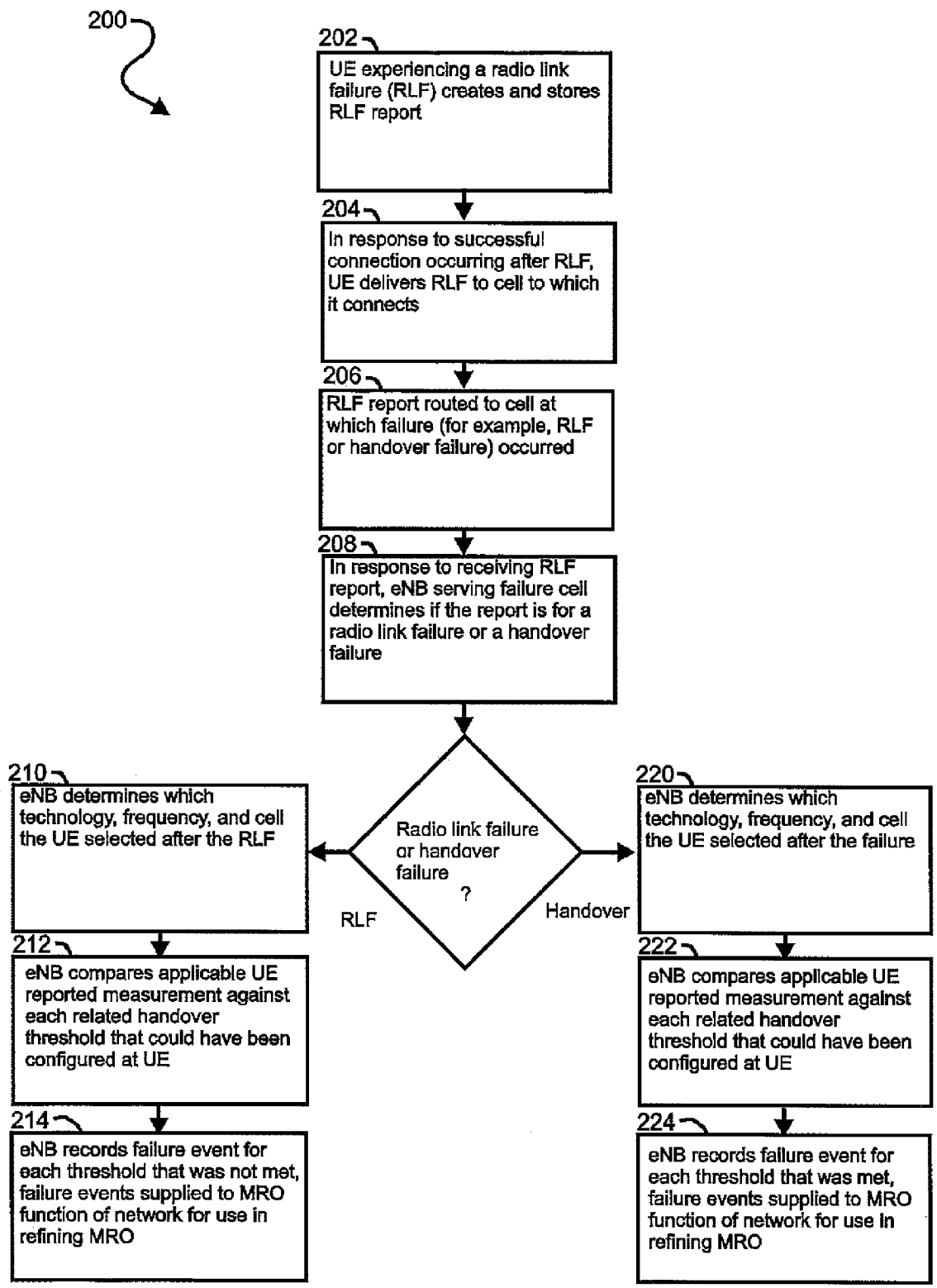
FIG. 2 illustrates a process according to an embodiment of the present invention.

FIG. 2, then, illustrates a process 200 of analyzing a radio link failure, according to one or more embodiments of the present invention. At block 202, a UE experiencing a radio link failure creates and stores a radio link failure (RLF) report. At block 204, in response to a successful connection occurring after the radio link failure, the UE delivers the RLF report to the cell to which it connects. At block 206, the RLF report is routed to the cell at which the RLF occurred—the failure cell. At block 208, in response to receiving the RLF report, the eNB serving the failure cell (for convenience, referred to here as the failure eNB) determines if the report is for a radio link failure or a handover failure. If the report is for a radio link failure, the process proceeds to block 210, and the eNB determines which technology, frequency, and cell the UE selected after the RLF. At block 212, the eNB compares the applicable UE reported measurement (suitably from measResultNeighCells-r9—for example, the UTRAN measurement) against each related handover threshold which could have been the threshold configured at the UE, if multiple thresholds of those available could have been responsible for causing the failure. At block 214, a failure event is recorded for each threshold that was not met and, at appropriate times, the failure events are supplied to a network MRO function for use in refining MRO.

Returning now to block 208, if the report is for a handover failure, the process proceeds to block 220. At block 220, the eNB, as at block 210, determines the handover target technology, frequency, and cell. At block 222, the eNB compares the applicable UE reported measurement (suitably from measResultNeighCells-r9—for example, the UTRAN measurement) against each related handover threshold which could have been the threshold configured at the UE, if multiple thresholds of those available could have been responsible for causing the failure. At block 224, a failure event will be recorded for each threshold that was met and, at appropriate times, the failure events are supplied to a network MRO function for use in refining MRO.

Figure 3:
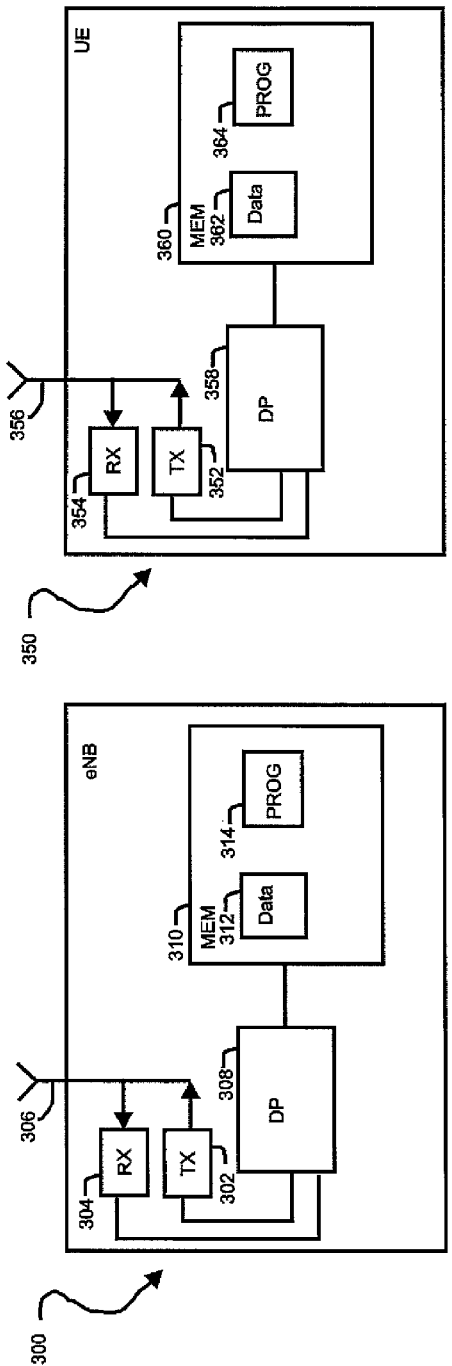
FIG. 3 illustrates elements that can be used to carry out embodiments of the present invention.

FIG. 3 presents details of an eNB 300, and a user equipment (UE) 350, suitable for carrying out one or more embodiments of the present invention. eNBs similar to the UE 300 may be implemented as, for example, the eNB 102A or the eNB 102B of FIG. 1. The eNB 300 may suitably comprise a transmitter 302, receiver 304, and antenna 306. The eNB 300 may also include a processor 308 and memory 310. The eNB 300 may employ data 312 and programs (FROGS) 314, residing in memory 310.

The UE 350 may suitably comprise a transmitter 352, receiver 354, and antenna 356. The UE 350 may also include a processor 358 and memory 360. The UE 350 may employ data 362 and programs (PROGS) 364, residing in memory 360.

At least one of the PROGs 314 in the eNB 300 is assumed to include a set of program instructions that, when executed by the associated DP 308, enable the device to operate in accordance with embodiments of this invention. In these regards, embodiments of this invention may be implemented at least in part by computer software stored on the MEM 310, which is executable by the DP 308 of the eNB 300, or by hardware, or by a combination of tangibly stored software and hardware (and tangibly stored firmware). Similarly, at least one of the PROGs 364 in the UE 350 is assumed to include a set of program instructions that, when executed by the associated DP 358, enable the device to operate in accordance with the exemplary embodiments of this invention, as detailed above. In these regards, embodiments of this invention may be implemented at least in part by computer software stored on the MEM 360, which is executable by the DP 358 of the UE 350, or by hardware, or by a combination of tangibly stored software and hardware (and tangibly stored firmware). Electronic devices implementing these aspects of the invention need not be the entire devices as depicted at FIG. 1 or FIG. 3 or may be one or more components of same such as the above described tangibly stored software, hardware, firmware and DP, or a system on a chip SOC or an application specific integrated circuit ASIC.

In general, the various embodiments of the UE 350 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 310 and 360 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 308 and 358 include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured to, with the at least one processor, configure the apparatus to at least:
   examine one or more measurements of radio conditions experienced by a user device operating in a wireless communication network;
   compare each of the one or more measurements of radio conditions against every handover threshold applicable to that measurement, that could have been the handover threshold configured for use at the user device at the time of the measurement; and
   record a failure event for each comparison that indicates that a failure could have occurred.

2. The apparatus of claim 1, wherein the one or more measurements of radio conditions are presented in a radio link failure report.

3. The apparatus of claim 1, wherein the one or more measurements of radio conditions comprise at least a measurement of radio conditions for a serving cell of the user device and a measurement of radio conditions for a neighbor cell of the serving cell of the user device, wherein the neighbor cell is a cell that either has been selected as handover target by the serving cell or has been autonomously selected by the user device after experiencing a radio link failure with the serving cell.

4. The apparatus of claim 1, wherein a serving cell of the user device, in response to becoming aware that the user device is attempting to connect to a different cell than the one selected for handover, records a failure event for the threshold that triggered the handover as well as for each threshold that is met and applies to the same handover target technology and frequency.

5. The apparatus of claim 1, wherein a serving cell of the user device, in response to becoming aware that the user device is attempting to access another cell before a handover is triggered, records a failure event for each threshold that is not met and would have triggered the handover to the selected technology and frequency selected by the user device.

6. The apparatus of claim 3, wherein the serving cell and the neighbor cell use different radio access technologies.

7. The apparatus of claim 3, wherein the apparatus is further caused to, in response to an indication by the report of a radio link failure, record a failure event for each applicable handover threshold that is not met by a measurement of radio conditions for the serving cell.

8. The apparatus of claim 3, wherein the apparatus is further caused to, in response to an indication by the report of a handover failure, record a failure event for each applicable handover threshold that is met by a measurement of radio conditions for the handover cell.

9. The apparatus of claim 6, wherein the serving cell uses third generation partnership project long term evolution technology and the neighbor cell uses universal terrestrial radio access network technology.

10. The apparatus of claim 1, wherein one or more of the failure events are provided to a mobility robustness optimization function of the network for analysis.

11. A method comprising:
   examining a radio link failure report originating at a user device operating in a wireless communication network, wherein the radio link failure report includes one or more measurements of radio conditions experienced by the user device;

comparing each of the one or more measurements of radio conditions against every handover threshold applicable to that measurement, that could have been the handover threshold configured for use at the user device at the time of the measurement; and recording a failure event for each comparison that indicates that a failure could have occurred.

12. The method of claim 11, wherein the one or more measurements of radio conditions are presented in a radio link failure report.

13. The method of claim 11, wherein the one or more measurements of radio conditions comprise at least a measurement of radio conditions for a serving cell of the user device and a measurement of radio conditions for a neighbor cell of the serving cell of the user device, wherein the neighbor cell, is a cell that either has been selected as handover target by the serving cell or has been autonomously selected by the user device after experiencing a radio link failure with the serving cell.

14. The method of claim 11, wherein a serving cell of the user device, in response to becoming aware that the user device is attempting to connect to a different cell than the one selected for handover, records a failure event for the threshold that triggered the handover as well as for each threshold that is met and applies to the same handover target technology and frequency.

15. The method of claim 11, wherein a serving cell of the user device, in response to becoming aware that the user device is attempting to access another cell before a handover is triggered, records a failure event for each threshold that is not met and would have triggered the handover to the selected technology and frequency selected by the user device.

16. The method of claim 13, wherein the serving cell and the neighbor cell use different radio access technologies.

17. The method of claim 13, further comprising, in response to an indication of a radio link failure by the radio link failure report, recording a failure event for each applicable threshold that is not met by a measurement of radio conditions for the serving cell.

18. The method of claim 13, further comprising, in response to an indication of a handover failure by the radio link failure report, recording a failure event for each applicable threshold that is met by a measurement of radio conditions for the neighbor cell.

19. The method of claim 16, wherein the serving cell uses third generation partnership project long term evolution technology and the neighbor cell users universal terrestrial radio access network technology.

20. The method of claim 11, wherein one or more of the failure events are provided to a mobility robustness optimization function of the network for analysis.

21. A non-transitory computer readable medium storing a program of instructions, execution of which by a processor configures an apparatus to at least:

examine a radio link failure report originating at a user device operating in a wireless communication network, wherein the radio link failure report includes one or more measurements of radio conditions experienced by the user device;

compare each of the one or more measurements of radio conditions against every handover threshold applicable to that measurement, that could have been the handover threshold configured for use at the user device at the time of the measurement; and record a failure event for each comparison that indicates that a failure could have occurred.

22. The non-transitory computer readable medium of claim 21, wherein the one or more measurements of radio conditions are presented in a radio link failure report.

23. The non-transitory computer readable medium of claim 21, wherein the one or more measurements of radio conditions comprise at least a measurement of radio conditions for a serving cell of the user device and a measurement of radio conditions for a neighbor cell of the serving cell of the user device, wherein the neighbor cell, is a cell that either has been selected as handover target by the serving cell or has been autonomously selected by the user device after experiencing a radio link failure with the serving cell.

24. The non-transitory computer readable medium of claim 21, wherein a serving cell of the user device, in response to becoming aware that the user device is attempting to connect to a different cell than the one selected for handover, records a failure event for the threshold that triggered the handover as well as for each threshold that is met and applies to the same handover target technology and frequency.

25. The non-transitory computer readable medium of claim 21, wherein a serving cell of the user device, in response to becoming aware that the user device is attempting to access another cell before a handover is triggered, records a failure event for each threshold that is not met and would have triggered the handover to the selected technology and frequency selected by the user device.

26. The non-transitory computer readable medium of claim 25,
wherein the serving cell and the neighbor cell use different radio access technologies.

27. The non-transitory computer readable medium of claim 25, wherein the apparatus is further configured to, in response to an indication by the report of a radio link failure, record a failure event for each applicable handover threshold that is not met by a measurement of radio conditions for the serving cell.

28. The non-transitory computer readable medium of claim 25, wherein the apparatus is further configured to, in response to an indication by the report of a handover failure, record a failure event threshold that is met by a measurement of radio conditions for the neighbor cell.

29. The non-transitory computer readable medium of claim 27, wherein the serving cell uses third generation partnership project long term evolution technology and the neighbor cell uses universal terrestrial radio access network technology.

* * * * *